March 24, 1970     A. W. MATTESON     3,502,865
LUMINAIRE Filed July 13, 1967     6 Sheets-Sheet 1

INVENTOR:
BY ARTHUR W. MATTESON
ATTORNEY.

March 24, 1970  A. W. MATTESON  3,502,865
LUMINAIRE
Filed July 13, 1967  6 Sheets-Sheet 3

INVENTOR:
ARTHUR W. MATTESON
BY John H Sutherland
ATTORNEY,

March 24, 1970  A. W. MATTESON  3,502,865
LUMINAIRE
Filed July 13, 1967  6 Sheets-Sheet 5

INVENTOR:
ARTHUR W. MATTESON
BY
ATTORNEY.

FIG.7

United States Patent Office 3,502,865
Patented Mar. 24, 1970

3,502,865
LUMINAIRE
Arthur W. Matteson, Webster Groves, Mo., assignor to The Edwin F. Guth Company, St. Louis, Mo., a corporation of Missouri
Filed July 13, 1967, Ser. No. 656,625
Int. Cl. F21s *1/06, 3/06;* F21v *13/04*
U.S. Cl. 240—78                                                  7 Claims

ABSTRACT OF THE DISCLOSURE

A lens-reflector combination produces a square light pattern of uniform intensity from a conventional electric bulb. A pyramidal reflector has a substantially square base and is coordinated with the bulb and a prismatic lens so that light incident upon the pyramidal sides of the reflector adjacent its corners is reflected into the corner areas of the lens and refracted there into the corners of the square light pattern. The lens is composed of a plurality of prisms set at right angles to each other thereby forming a square.

---

This invention relates generally to illumination, and particularly to a luminaire for producing a substantially uniform square pattern of light on a distant area perpendicular to nadir.

To achieve a square pattern of light from a single source, it has heretofore been proposed to utilize a conic reflector in combination with a prismatic lens of square periphery in which the prisms have circular apices and are arranged concentrically so that their radii progressively increase outwardly from the center of the lens as illustrated in U.S. Patent No. 2,082,100. While such lenses do refract their incident light so that the emergent light diverges into a substantially pyramidal beam, the uniformity of illumination at a distant surface perpendicular to nadir leaves much to be desired, particularly in the diagonal direction of the lens, and appears to involve the necessary toleration of considerable disparity between the intensity at the center and the intensity at the corners of an illuminated area some nine to twelve feet distant from the source, which disparity commonly amounts to the maximum intensity being more than fifty percent greater than the minimum intensity. Hence, the source must be more powerful than would be the case if the light distribution was more uniform. Even with the more powerful source, the lack of uniformity persists, and in situations where it is imperative that a workman, in the course of his duties, move or look repeatedly back and forth between regions of maximum intensity and regions of minimum intensity, ocular weariness or discomfort, and resultant inefficiency, is almost sure to result.

The situation can be, and has been, alleviated by deliberately wasting light (e.g., diverting it to a region where it is not necessary) selectively from the parts of the field where maximum intensity would otherwise result. Such was accomplished by utilizing a reflector or refractor which was transparent or translucent in the areas where it was desired to waste light which otherwise would render the desired distribution non-uniform.

The object of the invention is to provide a luminaire having a reflector-lens system capable of illuminating a square area on a distant surface with improved uniformity, particularly in the diagonal direction, and without deliberately wasting light.

Generally stated, the invention contemplates a luminaire having a light source within an opaque enclosure having a square, or substantially square, aperture, and which includes a substantially specular (i.e., specular or semispecular) reflector centered on nadir with the light source; the aperture being closed by an adjacent substantially flat prismatic lens having a square, or substantially square, periphery whose prismatic area is at least as great as that of the enclosure's aperture thereadjacent, and whose prisms are, for the most part, arrayed in a square pattern. For greatest efficiency, the reflector preferably includes a substantially pyramidal reflecting skirt whose base defines the aforesaid aperture; and the side walls of which are so sloped as to accumulate more reflected light per unit of area in the corners of the lens than elsewhere. With the source of light (such as an ordinary incandescent or high pressure vapor lamp bulb) aligned on nadir with the center of such a square prismed lens, the corners of the lens are more distant from the source than other parts of the lens, and consequently the unreflected light reaching the corners is at less intensity and at a lesser angle of incidence, than at those areas of the lens which are closer to the source. Depending upon the spacial relationship between the light source and the corners of the square lens, direct (unreflected) light rays may be incident upon the source-addressed surface of the lens at less than the critical angle, and hence would be lost unless intercepted and re-reflected by an immediately adjacent increment of reflector. Thus, by means of a reflector which accumulates its reflected light into the corner areas of the closely adjacent lens, the deficiency of unreflected light in those areas is compensated for.

The invention further contemplates that approximately half of the lens area be occupied by a succession of parallel prisms whose rectilinear apices delineate a succession of composite squares concentric with the center of the lens, but of progressively increasing dimension outwardly from the center; that outwardly of the largest composite prism square, there be four series of equispaced, parallel, rectilinear prisms of the same length as, and parallel with, those which constitute the sides of the largest composite prism square; and that each of the four corners of the lens be occupied by a series of equispaced, parallel prisms having curvilinear apices (of progressively increasing radii), and some of which, respectively, make continuity with the apices of the rectilinear prisms of the last-mentioned series in quadrature therewith. Preferably, the four corners of the largest composite prism square are at substantially the same distance from the center of the lens as the middle of the outer ones of the rectilinear prisms which do not form a complete square. The latter arrangement makes it feasible to top the pyramidal reflector with a conic, preferably spherical, reflector for concentrating its reflected light in a circular area (of the square lens) which is substantially tangent to the mid-point of the four outermost rectilinear prisms, as well as with the four corners of the largest composite prism square. Thus, a pyramidal reflector can be designed to address its reflected light largely into the four corner areas, outside said circular area, of the lens, and with emphasis upon those areas occupied by the prisms having arcuate apex lines.

For an illustrative embodiment of the invention, reference may be had to the accompanying drawings, in which.

Figure 1:
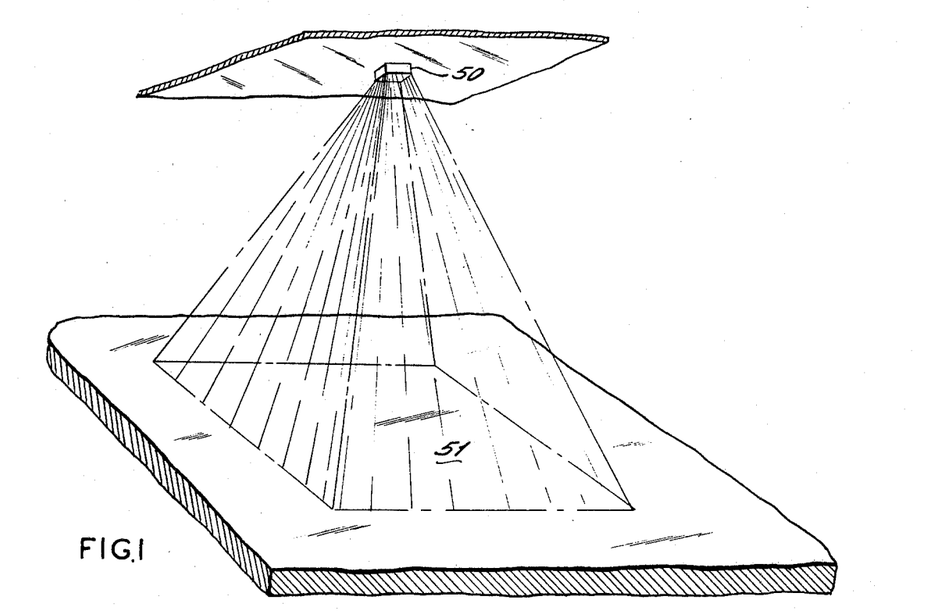
FIGURE 1 is a perspective view showing the luminaire in operative relation to a distant floor or work area to be illuminated with a square pattern of light.
Figure 2:
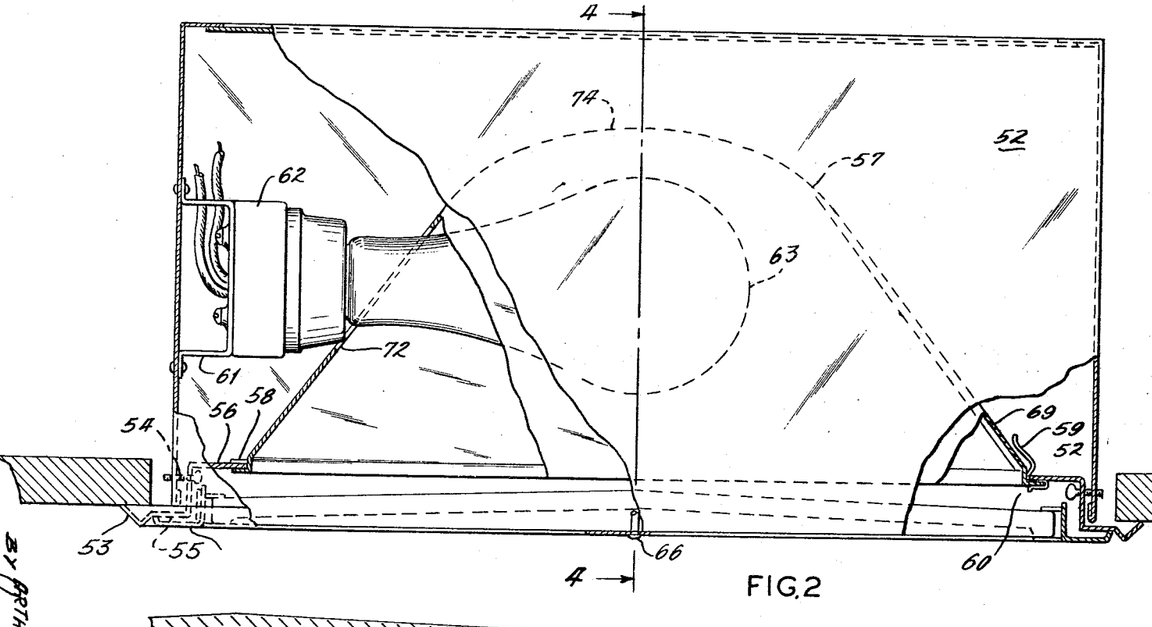
FIGURE 2 is a view in side elevation of the luminaire with some parts shown in section, and other parts broken away to reveal the internal relationship thereof.
Figure 3:
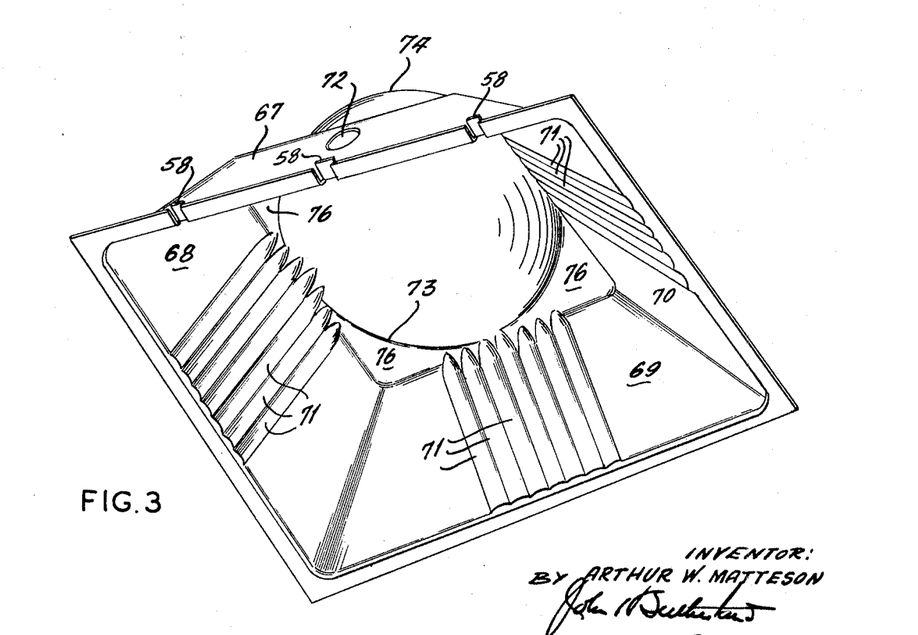
FIGURE 3 is a perspective view of a square apertured reflector forming part of the luminaire shown in FIGURE 2.
Figure 4:
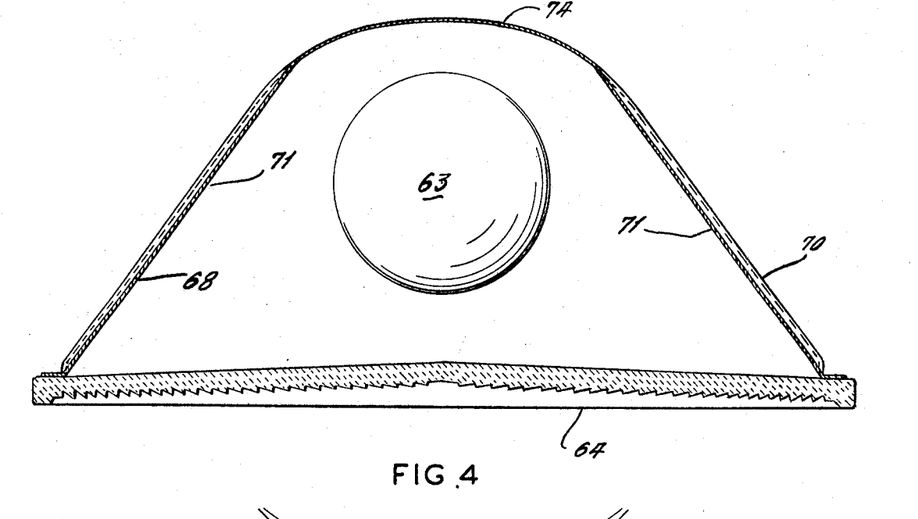
FIGURE 4 is a sectional view taken along plane 4—4 of FIGURE 2, showing the substantially flat lens and a conventional incandescent lamp bulb in operative position therein.
Figure 5:
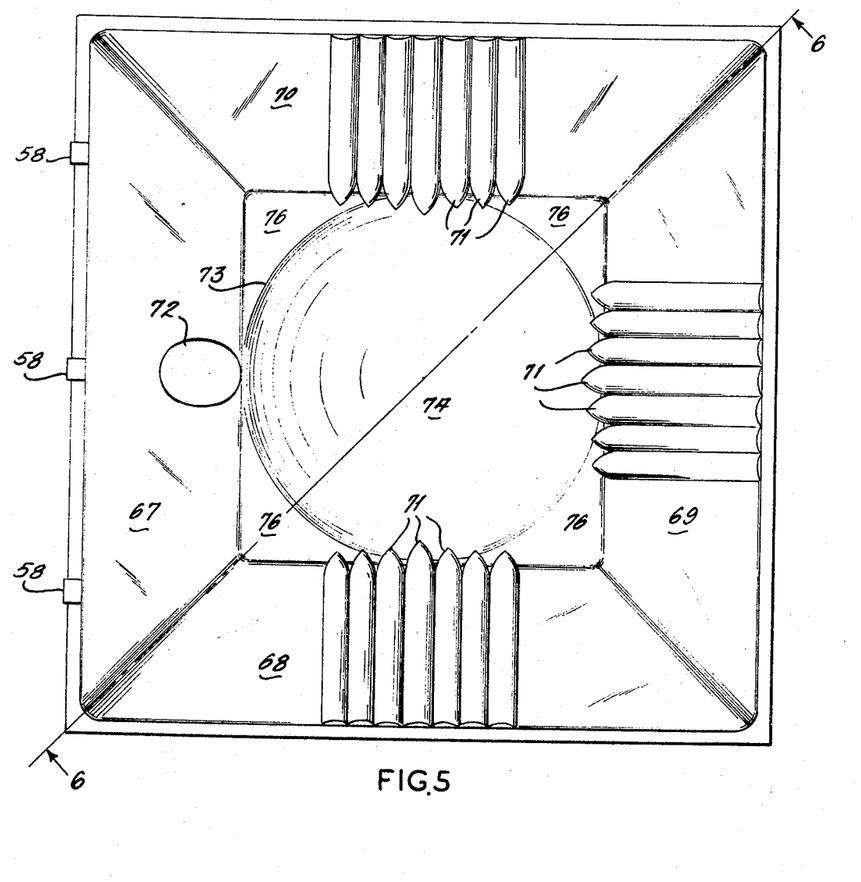
FIGURE 5 is a bottom view of the reflector shown in FIGURE 4.
Figure 6:
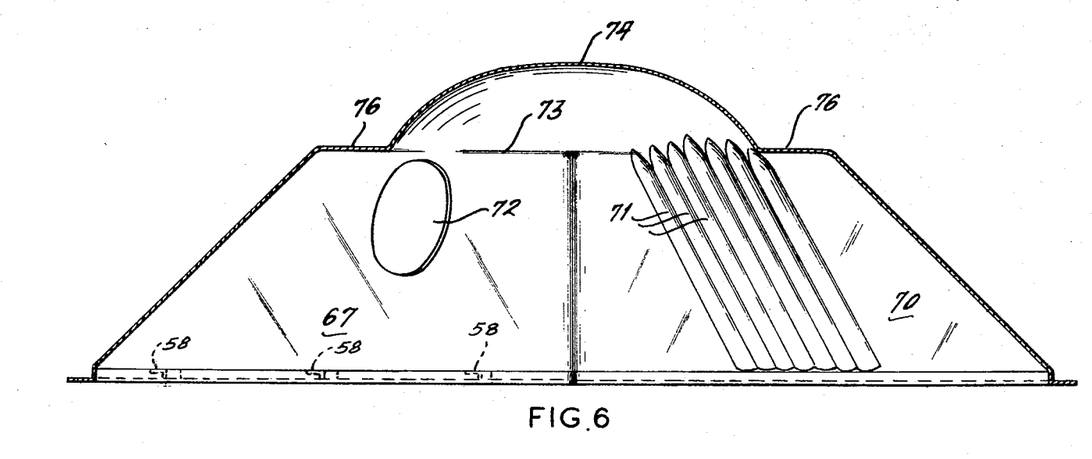
FIGURE 6 is a sectional view taken along the diagonal 6—6 of FIGURE 3.

The luminaire 50, shown as a whole in FIGURES 1 and 2, is in the form of a fixture intended to be recessed or semirecessed in the ceiling of a room for illuminating a floor area 51 some eight feet or more distant, with a light field which is substantially square in cross-section (perpendicular to nadir) so that the pattern of illumination on the floor is substantially square and of substantially uniform intensity. In the form shown, the luminaire is housed by a five-sided rectangular parallelepipedonal box 52, whose base is square and whose sides are rectangular, and the sixth, or bottom, side of which is open. The particular form of the box 52 is arbitrary, since it serves only to house and support the operative parts of the luminaire, and, in the form shown, to provide an enclosure which is recessed within the ceiling of a room. The box 52 is secured to the ceiling in any suitable way.

Circumscribing the square open side of the box 52 is a moulding 53, which may be, and preferably is, applied to the box 52 after the latter has been installed in the ceiling. In the form shown, the moulding 53 consists of four mitered sections of Z-bar, the vertical leg of which may be secured, as by screws 54, to the side walls of box 52 adjacent the open bottom thereof. The Z-bars 53 have outwardly extending legs 55 which cover and conceal the joint between the lower extremities of the sides of the box and the ceiling structure, and also provide a convenient mounting for the lens frame later to be described.

The Z-bars 53 have inwardly extending legs 56 which provide a convenient means for releasably supporting a reflector 57 within the box 52. In the form shown in FIGURE 2, the rim which circumscribes the aperture of the reflector 57 is equipped with a series of bights 58 to receive the free edge of the inwardly projecting leg 56 at that side of the reflector, while the opposite side of the reflector is equipped with a contorted leaf spring 59 embracing a flange 60 on that edge of the reflector so that once the bights 58 has been interlocked with the Z-bar leg 56 at one side, the spring 59 may be snapped over the edge of Z-bar leg 56 at the other side to retain the reflector in position within box 52. The bight 58 and the spring 59 may, if desired, be continuous along the respective opposite sides of the reflector, but it is preferred that they be discontinuous, as, for example, an inch wide with spaces between them.

On one side wall of the box 52, there is provided a U-shaped bridge 61, upon which is mounted a socket 62 for the reception of a conventional electric light bulb 63, which may be either an incandescent bulb or a high pressure vapor bulb.

Beneath the substantially square aperture of the reflector 57 and (to minimize waste of light) as close thereto as feasible, there is located a substantially flat prismatic lens 64 carried by a square frame, made, for example, of mitered lengths of the cross-section shown in FIGURE 2, whose vertical legs, at opposite sides of the frame, are spaced apart a distance sufficient to accommodate the lens 64 between them. The frame may be connected to the moulding 54 in any suitable manner, as, for example, by permanently hinging it at the side opposite that seen in FIGURE 2, and providing any suitable fastening means, such as screw 66, at the side shown in FIGURE 2, so that access may be readily had to the interior of reflector 57 by disconnecting the fastener 66 and permitting the frame, with its contained lens 64, to open.

The detail of box 52, moulding, 56, and its connection with reflector 57, as well as the detail of frame 65 and its connection with moulding 54, are environmental only, and are not critical to the invention, save insofar as they illustrate one arrangement for maintaining the operative parts in the desired relationship.

The operative parts of the embodiment of the invention shown in the drawings consist of: a reflector 57 with truncated pyramidal walls whose divergent extremities form the geometrical "base" of the pyramid, and delineate a substantially square aperture; the aperture is underlaid by an adjacent substantially flat prismatic lens 64 of substantially square periphery whose perimeter is slightly greater than that of the aperture; and a light source, such as bulb 63, supported with the center of its light field substantially aligned with the center of lens 64 and the vertical (nadir) axis of reflector 57. While the best overall efficiency is achieved with a reflector having a pyramidal skirt, other shapes can be substituted.

Referring now to FIGURES 3, 4, 5, and 6, for a detailed description of the reflector 57, it will be observed that the reflector has four truncated, triangular side walls 67, 68, 69 and 70, which are related to each other as the sloping sides of a pyramid having a substantially square base. The four sides of the reflector join each other in rounded corners. The reflector 57 is preferably made of sheet metal, and the interior surface thereof is substantially specular. Each of the four sides 67, 68, 69, and 70 is of substantially the same area, and each makes the same angle with the base of the pyramidal structure. Sides 68, 69 and 70 are provided, centrally thereof, with a series of flutes 71, while side 67 is not. The flutes 71 are not indispensable to the invention, but do serve the salutary purpose of so spreading the light which is incident upon them that objectionable glare, such as the image of the bulb 63 being visible through lens 64, is mitigated. Side 67 is unfluted, but centrally thereof there is provided a hole 72 disposed in alignment with socket 62, so that the screw-threaded end of the light bulb may be passed through opening 72 from the interior of the reflector and connected with socket 62.

At their top edges, the several pyramidal sections 67, 68, 69 and 70 of the reflector are centrally tangent with the substantially circular base 73 of a dome 74, which is preferably an integral part of the reflector, and is a segment of a sphere or near-sphere so designed as to reflect its incident light (emanating from the light center 75 of bulb 63) in a direction such as to uniformly distribute it in a field whose cross-section (normal to nadir) is substantially circular and confined by the respective pyramidal walls 67, 68, 69 and 70. As clearly shown in FIGURES 3, 5 and 6, the reflector has flat, triangular areas 76 at the four corners of the plane of juncture between dome 74 and the several pyramidal wall sections, said triangular flats 76 lying outside the circular base 73 for dome 74.

Figure 7:
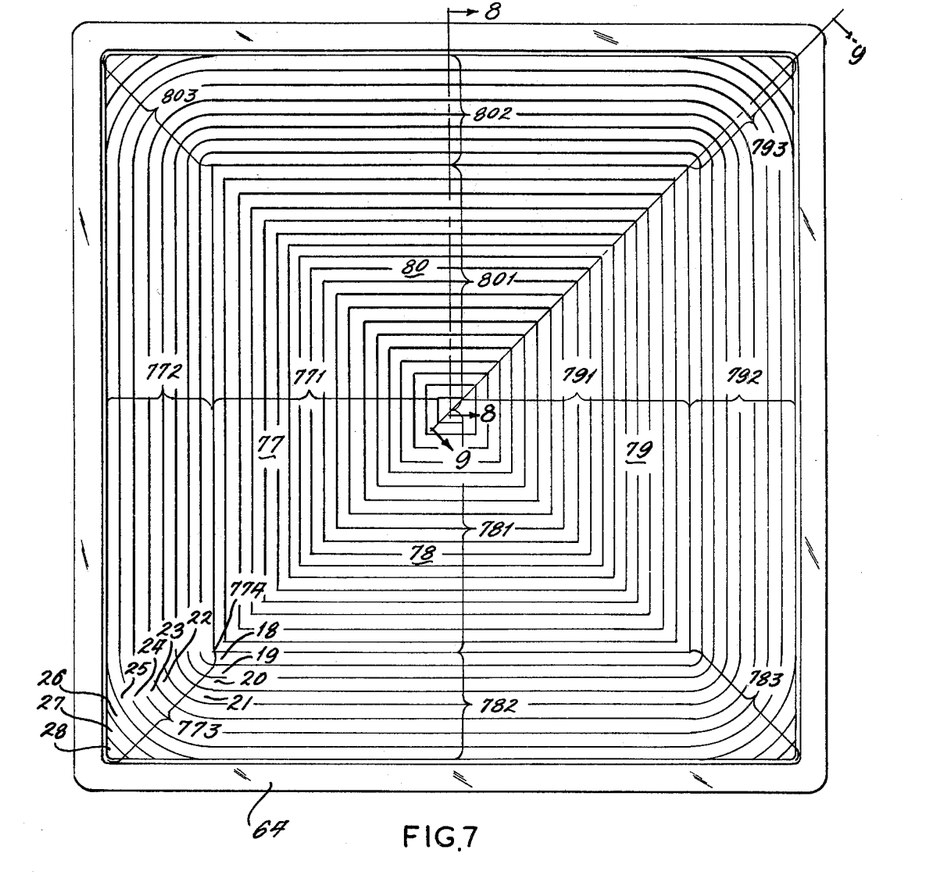
FIGURE 7 is a plan view of the exposed (out-) side of the lens shown in FIGURES 2 and 4.
Figure 8:
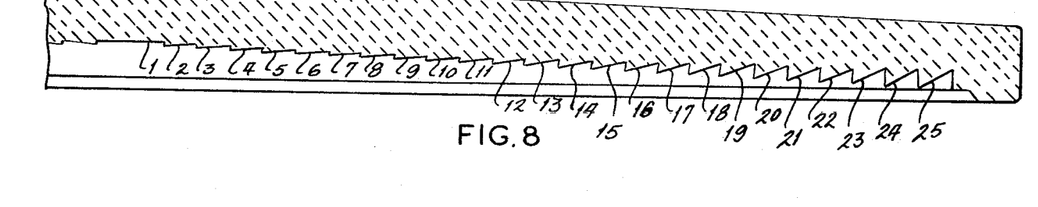
FIGURE 8 is a sectional view taken along line 8—8 of FIGURE 7, showing the cross-section of half the lens (the other half being identical but reversely oriented)
Figure 9:
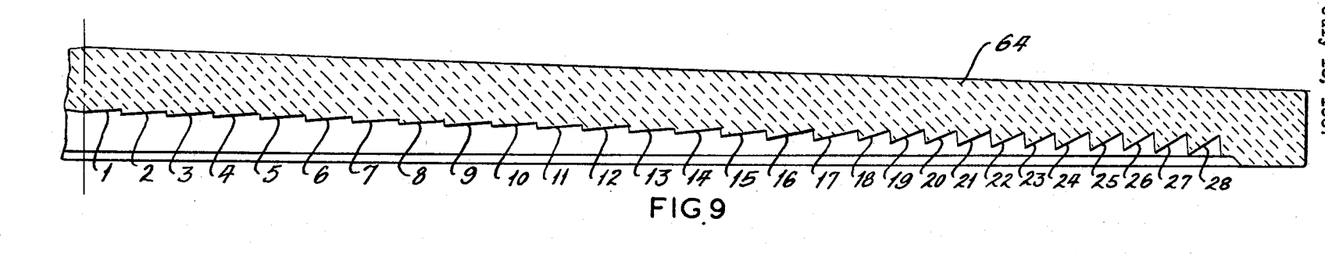
FIGURE 9 is a sectional view taken along line 9—9 of FIGURE 7, showing the cross-section of half the lens in the diagonal direction (the other half being identical but reversely oriented)

Like the open base which defines the aperture of the reflector 57, lens 64 is of substantially square periphery, and slightly larger than the substantially square aperture of reflector 57. As shown in FIGURES 7, 8, and 9, the lens 64 is a substantially flat molded glass or clear plastic plate whose bottom side (i.e., the side facing away from the light source 63) is molded to define four identical quadrants, 77, 78, 79, and 80, of twenty-five equi-spaced parallel prisms 1 through 25, whose apices are rectilinear. The number of prisms in the quadrants may vary depending upon the dimensions of lens 64, but, in the embodiment shown, which is for a lens approximately eight inches square, twenty-five is the preferred number.

Each if the four quadrants of prisms 77, 78, 79 and 80 is so coordinated with its two neighboring quadrants that the linear apices of the prisms in one quadrant extend in 90° relationship with the apices of the two neighboring quadrants, and those whose extremities lie within the circular field of light reflected from dome 74 makes apex-to-apex connection with those of their neighboring quadrants so as to form composite prism squares of progressively increasing magnitude from the center of the lens outwardly. Thus, each quadrant of parallel rectilinear prisms may be subdivided into two series one of which, 771, 781, 791 and 801 (for the respective quadrants) lies wholly within said circular field of light, and the other of which, 772, 782, 792 and 802 (for the respective quadrants) lies only partially within said circular field of reflected light. The prisms of the first-mentioned series form squares as aforesaid with each of their neighbors, while the prisms of the second-mentioned series do not form complete squares with their neighbors. On the contrary, the rectilinear prisms in series 772, 782, 792 and 802 have their extremities connected with the extremities of their neighbors in each of the four corners of the lens by the intermediary of a series of prisms having curvilinear apices 773, 783, 793 and 803 in each of the four corners of the lens. The several curvilinear prisms in the respective series 773, 783, 793 and 803 are parallel with each other, and, in the embodiment shown, are 90° arcs of concentric circles whose center is at the corresponding corner of the composite prism square formed by the apices of the outermost prism in neighboring series, such as corner 774 for curvilinear series 773. In the form shown, there are eleven curvilinear prisms 18 through 28, in each corner series 773, 783, 793, 803, thereof. The purpose of rounding the corners of the virtual squares formed by prism series 772, 782, 792, and 802 by the inter-position of curvilinear prisms 773, 783, 793 and 803, is to maintain the prism slope angle, diagonally at the corner (FIGURE 9), the same as that at a position (FIGURE 8) normal to parallelism of the rectilinear prisms in series 772, 782, 792 and 802. All prisms (rectilinear and curvilinear) in each of the four quadrants receive refracted rays of direct (unreflected) light from the source 63, although the angle of incidence (calculated from the center of the source) diminishes as the distance from nadir increases. In addition, all prisms, except those completely shaded by the bulb 63, receive refracted rays which had been reflected by the reflector, but the intensity of the latter increases as the distance of the prisms from nadir increases.

Figure 10:
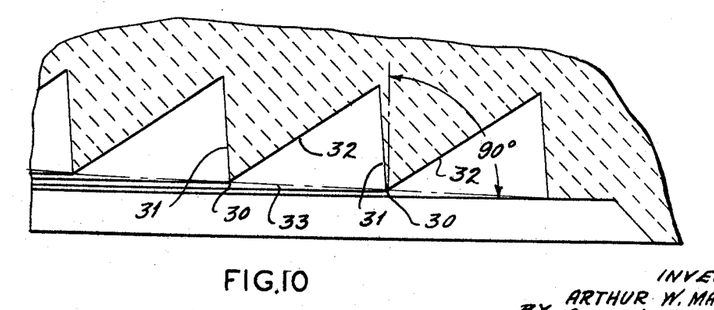
FIGURE 10 is an enlargement of a portion of FIGURE 8.

To clarify the nomenclature, reference may be had to FIGURE 10 of the drawings, wherein three prisms are shown on enlarged scale. By "apex" is meant the intersection 30 of a prism's "riser" face 31 with its "slope" face 32. The "slope angle" is the angle between face 32 and an inter-apicial straight line 33 which is tangent with all apices 30. In the embodiment shown, the inter-apicial line 33 is, for aesthetic reasons, about 2° off perpendicular to nadir, so that the prismatic face of the lens 64 is slightly concave, but it will be understood that the lens may be so constructed that the inter-apicial line 33 is truly perpendicular to nadir. As shown in FIGURE 8, the inter-apex distance between successive rectilinear prisms is constant throughout in the direction perpendicular to the parallelism of the prisms in series 771–772, 781–782, 791–792, ond 801–802, respectively; which, in the embodiment illustrated, is five thirty-seconds of an inch; and as will be clear from FIGURE 9, such distance between the apices of prisms 1 through 17 is likewise constant in the diagonal direction, but is greater than the inter-apex spacing, in the diagonal direction, of curvilinear prisms in series 773, 783, 793 and 803, which, among themselves, are constant. Such constancy of spacing is not indispensable to the invention, but, from the standpoint of uniformity, is preferred.

From FIGURE 10, it will also be apparent that the several risers 31 depart from perpendicular relationship with inter-apicial line 33. Such departure is sufficient to facilitate removal of the lens from its mold by providing "draft," and amounts to sloping the several risers 31 counterclockwise (as seen in FIGURE 10) beyond parallel with nadir, but since the risers are of inconsequential effect in the desired light distribution, their inclination, within the limits required for draft, may be ignored.

On the other hand, the slope angle of the several prisms is of importance in achieving the desired light distribution, and accordingly for the embodiment of the lens shown in the drawing, the several slope angles are here tabulated for prisms 1 through 25 in the section shown in FIGURE 8, and for prisms 26, 27 and 28 in the section shown in FIGURE 9:

| No. | Angle, ° | No. | Angle, ° | No. | Angle, ° | No. | Angle, ° |
|---|---|---|---|---|---|---|---|
| 1 | 2½ | 8 | 12½ | 15 | 25 | 22 | 35 |
| 2 | 2½ | 9 | 12½ | 16 | 30 | 23 | 35 |
| 3 | 5 | 10 | 17½ | 17 | 30 | 24 | 35 |
| 4 | 5 | 11 | 17½ | 18 | 30 | 25 | 35 |
| 5 | 7½ | 12 | 22½ | 19 | 35 | 26 | 35 |
| 6 | 7½ | 13 | 22½ | 20 | 35 | 27 | 35 |
| 7 | 12½ | 14 | 25 | 21 | 35 | 28 | 35 |

As will be understood, with the slope angle thus progressively increasing from the center of the lens outwardly, the altitude o fthe risers correspondingly increases.

In spite of the slight concavity of the prismatic face of lens 64, the thickness of the lens (measured normal to the inter-apicial line 33) may be substantially constant as shown, but, if desired for aesthetic reasons, the source-addressed face 34 may depart from true flatness in the four quadrants. For example, it may be formed with integral flutes or other decorative bas- or cavo- relief which departs from the general flatness not more than about 0.015 inch.

As previously pointed out, the pyrimidal walls 67, 68, 69 and 70, as well as their curved junctures, are designed to accumulate light in the four corners of lens 64 in order to supply the light necessary to fill in the corners of a square field outside the circular field emanating from dome 74 and directly from bulb 63. Light to fill in such corners reaches the corner areas of lens 64 by several routes, to wit:

(1) Direct reflection from the pyrimidal walls of light which is incident upon them within the parameters of about 5° below level with the light center 75, and of about 20° on each side of the diagonal of the aperture;

(2) Direct reflection from the corner flats 76;

(3) Reflection from the corner flats 76 to the adjacent pyramidal walls and re-reflection from the latter above the level of light center 75;

(4) Reflection from one pyramidal wall descendingly to the other at the same corner which may involve a plurality of re-reflections;

(5) Reflection of light incident at less than the critical angle (37° for glass having a 1.5 Index of Refraction) upon the source-addressed face 34 of the lens with re-re-flection from the pyramidal walls or the rounded juncture between them.

Figure 11:
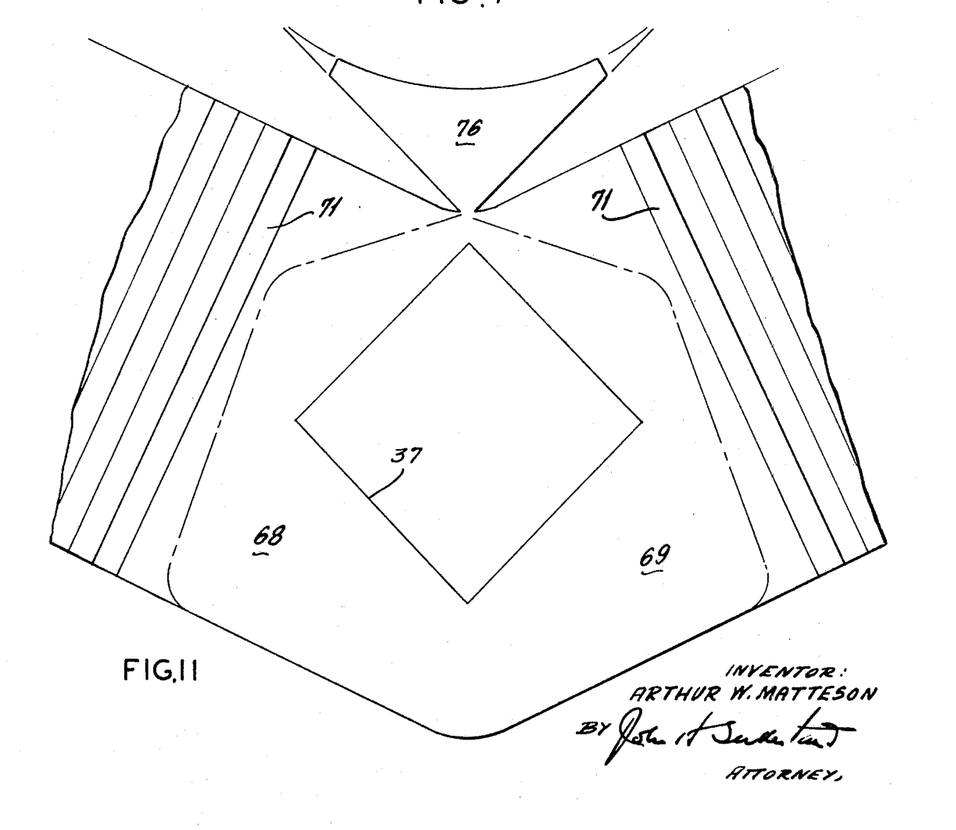
FIGURE 11 is a planar development of a corner of the pyramidal portion of the reflector shown in FIGURES 4, 5 and 6, and showing, in dotted outline, the area thereof which concentrates reflected light into the curvilinear series of prisms in the corresponding corner of the lens.

The concentration of reflected light in the corners is illustrated by FIGURE 11, which is a planar development of the area of two pyramidal walls at a corner of the reflector plus one flat 76. The dotted line 36 delineates the area of the pyramidal walls upon which substantially all incident light is reflected, directly or indirectly, into the series of curvilinear prisms, such as 783, embraced by those walls. Likewise, substantially all light incident upon the adjacent flat 76 is reflected, directly or indirectly, into the same series of curvilinear prisms. Dash line 37 in FIGURE 11 delineates the proportional area relationship of the series of curvilinear prisms at one corner. From FIGURE 11, it is apparent that, at any given corner of the reflector, the total area which reflects substantially all incident light into the curvilinear prism area of the lens is more than five times the curvilinear prism area. In contrast, the total area of all four pyramidal walls is approximately 1.25 times the total area of the source-addressed face 34 of the lens 64. Hence, the accumulation of reflected light on the areas occupied by the several curvilinear prism series 773, 783, 793 and 803 compensates for the deficiency thereat of unreflected light, and of light reflected directly from dome 74, with the result that, in a typical test of a luminaire constructed in accordance with the present invention and equipped with a conventional 300-watt incandescent lamp bulb, a square 11 ft. x 11 ft. work plane, nine feet distant from the lens, centered with and normal to nadir, the light distribution (in foot-candles), square foot by square foot, was as tabulated below:

|    | 1  | 2  | 3  | 4  | 5  | 6  | 7  | 8  | 9  | 10 | 11 |
|----|----|----|----|----|----|----|----|----|----|----|----|
| 1  | 36 | 36 | 35 | 33 | 31 | 30 | 31 | 33 | 35 | 36 | 36 |
| 2  | 36 | 36 | 35 | 34 | 33 | 33 | 33 | 34 | 35 | 36 | 36 |
| 3  | 35 | 35 | 35 | 34 | 35 | 35 | 35 | 34 | 35 | 35 | 35 |
| 4  | 33 | 34 | 34 | 35 | 34 | 34 | 34 | 35 | 34 | 34 | 33 |
| 5  | 31 | 33 | 35 | 34 | 34 | 34 | 34 | 34 | 35 | 33 | 31 |
| 6  | 30 | 33 | 35 | 34 | 34 | 33 | 34 | 34 | 35 | 33 | 30 |
| 7  | 31 | 33 | 35 | 34 | 34 | 33 | 34 | 34 | 35 | 33 | 31 |
| 8  | 33 | 34 | 34 | 35 | 34 | 34 | 34 | 35 | 34 | 34 | 33 |
| 9  | 35 | 35 | 35 | 34 | 35 | 35 | 35 | 34 | 35 | 35 | 35 |
| 10 | 36 | 36 | 35 | 34 | 33 | 33 | 33 | 34 | 35 | 36 | 36 |
| 11 | 36 | 36 | 35 | 33 | 31 | 30 | 31 | 33 | 35 | 36 | 36 |

The values average 34 footcandles, and the uniformity ratio is:

$$\frac{\text{Maximum footcandles}}{\text{Minimum footcandles}} = \frac{36}{30} = 1.20$$

The test was repeated with all variables the same except that the lens of the invention was replaced by one wherein the prisms had apex lines which were circular, and arranged in concentric equi-spaced circles (arcs of circles in the corners) of progressively increasing radius from the center outwardly, the results were as follows:

|    | 1  | 2  | 3  | 4  | 5  | 6  | 7  | 8  | 9  | 10 | 11 |
|----|----|----|----|----|----|----|----|----|----|----|----|
| 1  | 35 | 36 | 34 | 33 | 31 | 30 | 31 | 33 | 34 | 36 | 35 |
| 2  | 36 | 35 | 34 | 32 | 31 | 30 | 31 | 32 | 34 | 35 | 36 |
| 3  | 34 | 34 | 32 | 30 | 29 | 28 | 29 | 30 | 32 | 34 | 34 |
| 4  | 33 | 32 | 30 | 28 | 27 | 26 | 27 | 28 | 30 | 32 | 33 |
| 5  | 31 | 31 | 29 | 27 | 25 | 25 | 25 | 27 | 29 | 31 | 31 |
| 6  | 30 | 30 | 28 | 26 | 25 | 24 | 25 | 26 | 28 | 30 | 30 |
| 7  | 31 | 31 | 29 | 27 | 25 | 25 | 25 | 27 | 29 | 31 | 31 |
| 8  | 33 | 32 | 30 | 28 | 27 | 26 | 27 | 28 | 30 | 32 | 35 |
| 9  | 34 | 34 | 32 | 30 | 29 | 28 | 29 | 30 | 32 | 34 | 34 |
| 10 | 36 | 35 | 34 | 32 | 31 | 30 | 31 | 32 | 34 | 35 | 33 |
| 11 | 35 | 36 | 34 | 33 | 31 | 30 | 31 | 33 | 34 | 36 | 36 |

These values average 31 footcandles, and the uniformity ratio is:

$$\frac{36}{24} = 1.50$$

Those skilled in the art will recognize that with the luminaire shown in the drawings, the only wasted light is that which escapes through the tolerance between the hole 72 and the lamp bulb, and that which escapes through the portion of the bulb envelope on the exterior of the reflector.

From the foregoing description, those skilled in the art will readily understand that the invention accomplishes its object, and provides a simple and inexpensive luminaire for illuminating a distant work plane with a square field of illumination of substantially uniform intensity theroughout. While one complete embodiment of the invention has been described in detail, it will be understood that the invention is not limited to the precise finite values herein stated for the purpose of illustration, but that, consistent with the present invention, the luminaires, lenses, and reflectors may be made in a variety of sizes to produce the desired square pattern of illumination of varying magnitude.

Having thus described the invention, what is claimed and desired to be secured by Letters Patent is:

1. In an illumination device for producing a substantially square pattern of light on a distant surface perpendicular to nadir, the combination with a light source of a reflector covering and depending below said light source, said reflector having a substantially square aperture and substantially pyramidal walls diverging toward and circumscribing said aperture, and a prismatic lens of substantially square periphery whose perimeter is at least as great as the perimeter of said aperture, said lens being located adjacent said aperture to cover the same and having:
   (a) a first set of four series of parallel prisms each having a rectilinear apex, the respective series being arranged in quadrature, the prisms in alternate series being parallel with each other and perpendicular to the prisms in the adjacent series, the respective ends of each prism joining with an end of a prism in an adjacent series to form a corner of a composite prism having a substantially square outline, the prisms in each of said four series being of progressively increasing length outwardly from the center of said lens whereby the respective composite prisms formed thereby have linear apices of progressively increasing perimeter,
   (b) a second set of four series of parallel prisms each having a rectilinear apex parallel with the rectilinear apices of the respective ones of said first set (a),
   (c) a third set of four series of parallel prisms each having a curvilinear apex connecting the ends of rectilinear prisms in one series of said second set with the end of a rectilinear prism in an adjacent series of said second set,
the series of said third set being disposed respectively in the four corners of said square prismatic lens.

2. The combination of claim 1 wherein the lens is substantially flat and each corner thereof has additional curvilinear apexed prisms parallel with and disposed diagonally outwardly of the series of said third set (c) thereadjacent.

3. The combination of claim 1 wherein adjacent ones of said pyramidal walls have a rounded juncture with each other.

4. The combination of claim 1 wherein said reflector includes a dome reflector above said pyramidal walls.

5. The combination of claim 4 wherein said dome reflector has a substantially circular base.

6. The combination of claim 5 wherein the base of said dome reflector is substantially tangent with the mid-points of the respective pyramidal walls, and triangular reflective flats connect the base of said dome with said pyramidal walls.

7. A luminaire comprising, a light source having a center defining nadir, a metallic reflector having a substantially specular interior surface, said reflector including:
   (b) a skirt portion defining a substantially square aper- and centered about nadir,
   (b) a skirt portion defining a substantially equare aperture located below said light source and centered about nadir,
and a substantially flat prismatic lens located adjacent and closing said aperture, said lens having a substantially square periphery whose perimeter is at least as great as said aperture, and having:
   (c) a first array of prism parts whose apices are rectilinear, each prism part of said array cornering with two neighboring prism parts whose apices lie at right angles thereto, to collectively form a pattern of geometrically similar squares whose perimeters progressively increase outwardly from, and are centered about, nadir;
   (d) a second array of prism parts outwardly of said first array, some of whose apices are rectilinear and other of whose apices are arcuate, each rectilinear apexed part in said array joining with two arcuate neighbors thereof so that the apices of the former are tangent with the apices of the latter to collectively form a pattern of geometrically similar squares having rounded corners and whose perimeters progressively increase outwardly from said first array, and are centered about nadir;

(e) a third array of prisms having arcuate apices parallel with the arcuate parts of said second array and of progressively decreasing length outwardly from nadir to collectively form a pattern which squares out the rounded corners of the squares formed by said second array;

one half of all the rectilinear apexed prism parts in said first and second arrays being parallel with each other, and the other half thereof being parallel with each other but perpendicular to said one half, the arcuate prism parts in said second array each being a 90° arc of concentric circles whose center is at the corresponding corner of the largest square formed by said first array.

References Cited

UNITED STATES PATENTS

| | | | |
|---|---|---|---|
| 2,082,100 | 6/1937 | Dorey | 240—106.1 |
| 2,935,602 | 5/1960 | Fremont | 240—78 |
| 3,020,395 | 2/1962 | Peltz | 240—106 |
| 3,401,258 | 9/1968 | Guth | 240—103 |

NORTON ANSHER, Primary Examiner

D. S. STALLARD, Assistant Examiner

U.S. Cl. X.R.

240—93, 103, 106.1

UNITED STATES PATENT OFFICE
CERTIFICATE OF CORRECTION

Patent No. 3,502,865                                              March 24, 1970

Arthur W. Matteson

It is certified that error appears in the above identified patent and that said Letters Patent are hereby corrected as shown below:

Column 5, line 3, "if" should read -- of --; line 68, "ond" should read -- and --. Column 6, line 32, "o fthe" should read -- of the --. Column 7, second table, twelfth column, lines 8, 10 and 11, "35", "33" and "36" should read -- 33 --, -- 36 -- and -- 35 --; line 68, "theroughout" should read -- throughout --. Column 8, lines 58 and 59, "(b) a skirt portion defining a substantially square aper- and centered about nadir," should read -- (a) a concave surface located above said light source and centered about nadir, --; line 60, "equare" should read -- square --; line 74, "parts outwardly" should read -- parts, outwardly --.

Signed and sealed this 29th day of December 1970.

(SEAL)
Attest:

EDWARD M. FLETCHER, JR.                              WILLIAM E. SCHUYLER, JR.
Attesting Officer                                        Commissioner of Patents